United States Patent
Sedan et al.

(10) Patent No.: US 12,050,576 B2
(45) Date of Patent: Jul. 30, 2024

(54) ANALYTICS DATABASE AND MONITORING SYSTEM FOR STRUCTURING AND STORING DATA STREAMS

(71) Applicant: Datadog, Inc., New York, NY (US)

(72) Inventors: Boaz Sedan, Palo Alto, CA (US); Geraud Louis Boyer, Campbell, CA (US)

(73) Assignee: Datadog, Inc., New York, NY (US)

(*) Notice: Subject to any disclaimer, the term of this patent is extended or adjusted under 35 U.S.C. 154(b) by 174 days.

(21) Appl. No.: 17/461,515

(22) Filed: Aug. 30, 2021

(65) Prior Publication Data
US 2023/0073627 A1   Mar. 9, 2023

(51) Int. Cl.
*G06F 16/215* (2019.01)
*G06F 16/22* (2019.01)
*G06F 16/2455* (2019.01)

(52) U.S. Cl.
CPC ........ *G06F 16/2237* (2019.01); *G06F 16/215* (2019.01); *G06F 16/24568* (2019.01)

(58) Field of Classification Search
CPC .............. G06F 16/2237; G06F 16/215; G06F 16/24568; G06F 16/2228; G06F 16/22; G06F 16/24
See application file for complete search history.

(56) References Cited

U.S. PATENT DOCUMENTS

| | | | | |
|---|---|---|---|---|
| 9,977,807 | B1* | 5/2018 | Bowman | G06F 16/381 |
| 2008/0281801 | A1* | 11/2008 | Larson | G06F 16/284 |
| 2009/0271529 | A1* | 10/2009 | Kashiyama | G06F 16/2455 710/1 |
| 2018/0314433 | A1* | 11/2018 | Guo | G06F 3/0659 |
| 2021/0357373 | A1* | 11/2021 | Vemulapalli | G06F 16/316 |
| 2022/0035784 | A1* | 2/2022 | Kambhammettu | G06F 16/2453 |

* cited by examiner

*Primary Examiner* — Maher N Algibhah
(74) *Attorney, Agent, or Firm* — Fish & Richardson P.C.

(57) ABSTRACT

A monitoring system is configured for de-duplicating data for storing in a database. The monitoring system is configured for receiving a message including a sequence of fields and corresponding field values; generating an entry in a first mapping table that associates each unique field and each unique field value of the message to a corresponding index value that is unique; generating a first vector including index values; ordering the index values of the vector, the ordered index values indicating a structure of the message; generating an entry in a second mapping table that associates the structure of the message with a structure index value; generating a second vector including the structure index value and an ordered set of index values representing the field values; and storing, in a database, the second vector.

20 Claims, 7 Drawing Sheets

ANALYTICS DATABASE AND MONITORING SYSTEM FOR STRUCTURING AND STORING DATA STREAMS

TECHNICAL FIELD

The disclosure relates to performance monitoring of applications executing on computing systems.

BACKGROUND

Application performance management (APM) is the monitoring and management of performance and availability of software applications. APM services are configured to detect and diagnose application performance problems to maintain an expected level of service for a given application. Generally, APM services are configured to report one or more information technology (IT) performance metrics in a way that describes how they affect real-world performance of the application (e.g., how they impact users of the application). Performance metrics that are monitored (e.g., by a monitoring system or application) can include response time metrics, which indicate a latency of responding to a user request by the application. Performance metrics that are monitored can include a measurement of computational resources being consumed by the application for a given action (e.g., for a response to a user query).

Generally, a monitoring system can include a service configured to receive data (e.g., from a client system) that describe an operation or event happening on a client device. The monitoring system can be configured to perform one or more actions in response to receiving the data in a time-sensitive manner. Examples of these actions include viewing the events as they happen, graphing trends and various values over time, searching for events that match some criteria, and correlating events that happen on multiple distributed machines relating to a single (user) operation.

SUMMARY

This disclosure describes an analytics database and an associated monitoring system. The monitoring system monitors one or more computing systems (e.g., client devices) that are configured for executing respective instances of an application associated with the monitoring system. The monitoring system includes a monitoring service configured to receive client data (e.g., from a client system or device) that describe an operation or event happening on a client device. The monitoring system can be configured to perform one or more actions in response to receiving the client data in a time-sensitive manner. The analytics database is configured to store the client data received from one or more client systems. In some implementations, the client data are received by the monitoring system as data streams.

The data streams generated by the client devices include data describing operations or events executed by the one or more client devices. The events represent a smallest unit of processing work (e.g., one or more instructions) performed by the client device that is of interest to the monitoring system. For example, an event can include a verification of a transaction, an error or exception (e.g., in a log message), a user subscribing to an email newsletter, or any such action performed that is relevant to the client system. As events occur at one or more client devices (which may include server systems that interact with user end devices), the client devices report the occurrence(s) of the events to the monitoring system in respective data streams.

The monitoring system is configured to structure the data streams received from the client system(s) for storage as structured event data in the analytics database. The structure of the client data enables an improvement of one or more performance metrics of monitoring services associated with the monitoring system. A monitoring service includes an action taken by the monitoring system in response to a request from a user of the monitoring system. A monitoring service can include generation a response to a query from a client system about the data streams generated by one or more client devices or systems. For example, a query can include a request for data from the analytics database indicative of instances of a particular event associated with one or more of the client devices, one or more end users of the client system, and so forth. In some implementations, the service can include generation of reports representing a summary of events represented in the data streams. The structure of the event data enables the monitoring system to respond to queries more quickly (e.g., with reduced latency) and using less processing capability (e.g., using fewer processing steps) relative to responding to queries for event data that are not structured as subsequently described.

The monitoring system structures the event data of the data stream using one or more of the following techniques. The monitoring system de-duplicates the event data. The de-duplicated data has a smaller data footprint and thus requires less storage space than the raw event data of the data stream. The process for de-duplication minimizes data overhead for mapping tables and performance of the de-duplication process, as subsequently described. The de-duplicated values of the event data can be represented in an event data de-duplication table.

The monitoring system is configured to de-duplicate a structure associated with event data in addition to the content (e.g., data values) of the event data. The structure of the event data is de-duplicated in a manner similar to the content of the event data. The de-duplicated structure data and the de-duplicated event data are stored together in a format that enables fast and precise responses to queries for event data in the analytics database. The de-duplicated values of the event data can be represented in a structured data de-duplication table.

The monitoring system is configured to perform template reduction for storing the de-duplicated structure data and de-duplicated event data. The monitoring system generates a template that represents a structure and values for given event data. The template represents a baseline to which new event data can be compared. Differences between new event data (either in the structure or values) are stored as difference data (e.g., difference bits), rather than a new copy of the event data.

The monitoring system is configured to perform query optimization based on the templates, de-duplicated structure data tables, and de-duplicated event data tables. For example, the tables themselves can be searched instead of the event data. The relatively small amount of data to be searched reduces a query response latency and processing bandwidth required to respond to the query, relative to searching the event data directly. For example, templates indicate whether a value being searched is present within the corresponding event data for that template (e.g., within a document, log entry, etc.). If the monitoring system finds that there is a template match to the queried value, the monitoring system ignores any event data associated with difference data indicating that the event data includes a different value. If there is no matching template, the monitoring system only searches event data associated with difference data indicating that it does include a different value than the templates.

The one or more computing systems can include client systems distributed over a computing network, each executing one or more instances of the application. The monitoring system generally includes a data processing system configured to communicate with the client systems on the network. The monitoring system is configured to monitor application exceptions of the application for the instances. Generally, the data of exceptions are generated by the one or more instances of the application during execution of the one or more instances of the application. The exceptions generally includes exceptions data such as a stack trace that illustrates how the application is executing. The exceptions can include one or more different types, such as those indicative of different errors or operations occurring from the one or more application instances. The exceptions can each include a stack trace showing a series of operations or actions performed by the application that caused the exception to occur.

Implementations of the subject matter described herein can provide various technical benefits. The analytics database storing the structured data and templates can result in improved performance for storage and querying of the data in the analytics database relative to typical database structures. Typical databases can include relational databases in which a well-known schema of the data are provided based on an information model and predetermined queries that are expected. Depending on the specific technology used, relational databases can be relatively slow at inserting new data and relatively quick to search, though only data in pre-defined categories (indices) are searchable. In another example, typical databases can include a key/value data store. In this example, all the event data are stored in the raw form. Key/value data stores are relatively very quick to ingest new data but are relatively slow to respond to queries, such as to provide analytics (e.g., frequently requiring iteration of the entire data-set). A document store provides an index of some parts of the data stream, sometimes generating indices on-the-fly. The document store can provide a performance mix between relational databases and key/value data stores. A time series includes a highly optimized system for ingesting event data, usually pre-computing various metrics (e.g., averages, sums, counts) of every data point as each arrives. Time series based databases generally provide a relatively fastest ingestion speed and fastest query speed. However, time series databases are the least flexible regarding providing responses to queries.

To overcome these technical challenges and provide each of a relatively fast and flexible ingestion speed, fast and flexible query response capability, and small storage footprint (when compared to typical solutions previously described), the analytics database stores the event data as structured data and templates, as previously described. The structured data of the analytics database represents all of the event data of the data streams received from the one or more client devices such that no information is lost. Additionally, the structured data can be less than 20% of the size of the raw event data of the data streams received. The analytics database is configured for relatively fast insertion performance, which describes how many new events are added to the database per unit of time. The analytics database is configured for relatively fast query performance, which includes how fast or efficiently the monitoring system is able to find event data in the analytics database matching a query. The structured data of the analytics database is configured for a relatively small storage size. The analytics database has a relatively high flexibility, which includes an ability to insert and query new attributes that are not predefined or otherwise anticipated in advance. For example, the process for generating the structured data allow for data of any schema, even such that is not known beforehand, to be stored efficiently.

The one or more advantages are enabled by one or more of the following embodiments.

In an aspect, a process for de-duplicating data for storing in a database includes receiving, from one or more computing systems, a message including a sequence of fields and corresponding field values. The process includes generating an entry in a first mapping table that associates each unique field and each unique field value of the message to a corresponding index value that is unique to that unique field or that unique field value. The process includes generating, based on the mapping table, a first vector including index values representing the fields and the corresponding field values of the message. The process includes ordering the index values of the vector based on the index values representing the fields, wherein the ordered index values, representing the fields, indicate a structure of the message. The process includes generating an entry in a second mapping table that associates the structure of the message with a structure index value. The process includes generating a second vector including the structure index value and an ordered set of index values representing the field values. The process includes storing, in a database, the second vector.

In some implementations, the process includes associating, in the second mapping table with the second vector, a template index value. In some implementations, the process includes generating a third vector including the template index value and a binary value, each bit of the binary value representing a presence or absence of a field value that differs from the field values represented in the second vector. In some implementations, the process includes storing, in the database, the third vector.

In some implementations, the process includes receiving a query for data comprising one of the fields or field values of the message. In some implementations, the process includes searching the first mapping table for the field or field value. In some implementations, the process includes retrieving the index value associated with the field or field value. In some implementations, the process includes searching the second mapping table for one or more template index values associated with the retrieved index value. In some implementations, the process includes analyzing each vector associated with one of the one or more template index values determine whether the query is satisfied by a particular message represented by the vector, the analyzing comprising determining that binary value indicates the presence, in the particular message, of one or more values or field values indicated by the query. In some implementations, the process includes determining, based on the analysis, that the third vector represents the message that satisfies the query. In some implementations, the process includes responding to the query based on determining that the third vector represents the message that satisfies the query.

In some implementations, the message is a first message, and the process includes receiving, from the one or more computing systems, a second message including a second sequence of fields and corresponding field values. In some implementations, the process includes determining, based on the first mapping table and the second mapping table, that a structure of the second message matches the structure of the first message. In some implementations, the process includes determining that the field values of the second message differ from the field values of the first message. In some implementations, the process includes generating a fourth vector representing the second message, the fourth vector comprising: the structure index value; a particular binary value indicating each field value of the second message that is different than a corresponding field value of the first message; and one or more additional index values representing the field values of the second message that are different from the corresponding field values of the first message.

In some implementations, the process includes associating a block of memory of the database with a time stamp value, the block of memory including the second vector; and for each entry in the first mapping table and each entry in the second mapping table associated with the first vector, including the time stamp value corresponding to the block of memory in the database that stores the second vector.

In some implementations, the process includes determining that a memory threshold for the database is exceeded by storing the second vector; deleting, from the database, each vector stored in a second block of memory associated with a second time stamp value that represents an earlier point in time than the time stamp value; and deleting, from the first mapping table and the second mapping table, each entry that includes the second time stamp.

In some implementations, a field or field value is unique when that field or field value is not yet included in an entry of the first mapping table including the time stamp; and when the field or the field value is mapped to a particular entry in the first mapping including a different time stamp value that represents an earlier point in time than the time stamp value, deleting the particular entry from the mapping table.

In some implementations, the process includes receiving a query for data comprising one of the fields or field values of the message. In some implementations, the process includes searching the first mapping table for the field or field value. In some implementations, the process includes retrieving the index value associated with the field or field value. In some implementations, the process includes searching the second mapping table for one or more structure index values associated with the retrieved index value. In some implementations, the process includes analyzing each vector associated with one of the one or more structure index values determine whether the query is satisfied by index values included in that vector. In some implementations, the process includes determining, based on the analysis, that the second vector satisfies the query. In some implementations, the process includes responding to the query based on determining that the second vector satisfies the query.

The details of one or more embodiments are set forth in the accompanying drawings and the description below. Other features and advantages will be apparent from the description and drawings, and from the claims.

DETAILED DESCRIPTION

Figure 1:
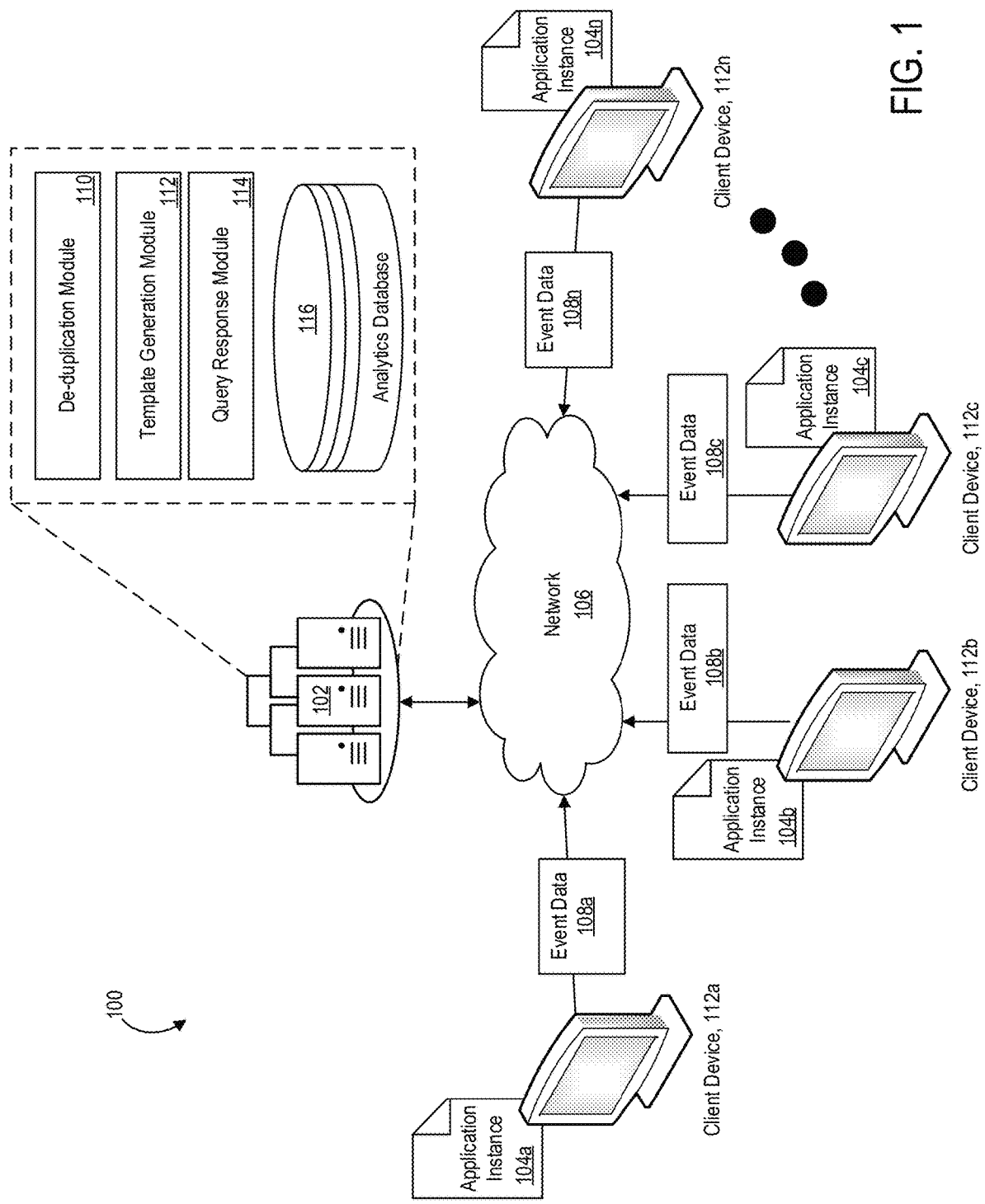
FIG. 1 is a diagram illustrating an example computing environment for a monitoring system configured for performing data de-duplication.

FIG. 1 is a diagram of an example computing environment 100 for networked computing system including a monitoring system 102 for one or more client devices 112a-n. The monitoring system 102 monitors one or more client devices 112a-n (e.g., computing systems or devices) that are configured for executing respective instances 104a-n of an application 104 associated with the monitoring system. The monitoring system 102 is configured to receive event data 108a-n (collectively event data 108) from client devices 112a-n.

The monitoring system 102 is configured to perform one or more monitoring services in a time-sensitive manner responsive to receiving the event data 108 or other data from a user (e.g., a query). The monitoring services can include generating reports regarding the ingested event data 108 that illustrate how a computing system associated with the client devices 112a-n is operating. The monitoring services can include generating a response to queries for statistics about how the application instances 104a-n are operating at the client devices 112a-n.

The monitoring system 102 includes a de-duplication module 110, a template generation module 112, and a query response module 114 for structuring the event data 108 and for performing monitoring services. The monitoring system 102 also includes an analytics database 116 configured for storing the event data received from the client devices 112a-n. The monitoring system 102 is configured to structure the event data 108 received from the client devices 112a-n using the de-duplication module 110, the template generation module 112, and the query response module 114. The structured event data 108 is stored in the analytics database 116 for performance of monitoring services. The structure of the event data 108 improves performance of the monitoring services. For example, the structure of the event data 108 can reduce query response times (e.g., response latency) for queries of the event data 108, reduce processing overhead for performing the monitoring services, and so forth. The modules 110, 112, and 114 and the processes they perform are subsequently described in greater detail. The analytics database 116 is also subsequently described in greater detail.

The client devices 112a-n are configured for executing respective instances 104a-n of the application 104. An application instance 104a-n can include a program configured to monitor processing behavior of the respective client device 112a-n. For example, the application instances 104a-n each generate respective event data 108a-n (collectively event data 108). The event data 108 includes data values that represent processing actions or behavior of a system or device associated with the application 104. The application is related to any system operation. The application instances 104a-n generate the event data 108a-n and send the event data to the monitoring system as respective data streams.

The event data 108 generated by the applications of the client devices 104a-n include data describing operations or events executed by the one or more client devices 104a-n. The events of the event data (also called traces) include a sequence of spans. Spans each represent a smallest unit of processing work (e.g., one or more instructions), performed by the client device 104a-n, that is of interest to the monitoring system 102. Spans generally have a particular structure (e.g., such as log messages or other machine-generated messages). For example, an event trace can include a verification of a transaction, an error or exception (e.g., in a log message), a user subscribing to an email newsletter, or any such action performed that is relevant to the client system. Spans can include the individual operations performed to verify the transaction, report the error, or subscribe the user to the newsletter. As events occur at one or more client devices 104a-n, the client devices report the occurrence(s) of the events to the monitoring system 102 in the respective data streams. In some implementations, applications 104a-n generate event data 108 as records or record files 108a-n.

Generally, the size, structure, and/or content of the events data are not known in advance by the monitoring system 102. The events data 108 are machine generated. The monitoring system 102 is configured to utilize a given structure in the events data 108, though the particular structure need not be defined or preconfigured with the monitoring system 102. The events data 108 are received from different client devices 104a-n using different types of applications 104a-n that report data in different ways using varied structures. The monitoring system 102 is configured handle these different structures of the event data without being preconfigured to do so.

In an example event trace, a user is shown as purchasing an item:

---

Trace: {id: 1,
  Span: {id: 1, user: john, service: cart, time: 1 pm, operation: additem, item:
coffee_table},
  span: {id: 2, service: warehouse, time: 1 pm, operation: check stock, item:
coffee_table}
  span: {id: 3, service: accounting, time: 1:01pm, operation: charge, user: john, amount: $100}
}

---

In this example, span 1 (having an ID value of "1") shows that a user "John" uses a service called "cart" at 1 PM. The operation includes adding an item (e.g., a coffee table) to the cart. Span 2 (having an ID value of "2") shows that a service "warehouse" is activated at 1 PM. The availability of the coffee table is checked in an operation "check_stock." In the third and final span 3 (having an ID value of "3") of the event trace, the service "accounting" is activated at 1:01 PM. The operation "charge" charges the user "John" $100. This example event data shows that some of the fields in each of the spans are common to all interactions (e.g., 'id' and 'time'). Additionally, some fields are unique per customer or the type of interaction (e.g., 'user' and 'amount'). There are substantial similarities among the spans. The monitoring system 102 can expect such similarities between or among different event traces that describe the same process (purchasing an item), even though structure across systems or processes can vary greatly. When storing the event trace describing a transaction, the monitoring system 102 can determine which portions of the event data are redundant and reduce (e.g., de-duplicate) the redundant data for storing in a data store. The de-duplication process is subsequently described.

The monitoring system 102 stores the event data 108 of the data streams in an analytics database 116. The stored event data 108 are queried by a user of the monitoring system 102 to determine how the client devices 112a-n are operating. The monitoring system 102 receives the event data 108a-n from each of the respective client devices 104a-n. The analytics database 116 is subsequently described in greater detail.

The monitoring system is configured to structure the data streams received from the client system(s) for storage as structured event data in the analytics database. The structure of the client data enables an improvement of one or more performance metrics of monitoring services associated with the monitoring system. The structure of the event data enables the monitoring system 102 to respond to queries more quickly (e.g., with reduced latency) and using less processing capability or bandwidth (e.g., using fewer processing steps) relative to responding to queries for event data that are not structured as subsequently described. Computing bandwidth refers to the available processing of the system that to perform processing operations, and is measured in computing cycles (e.g., processing time) or a similar metric. Computing resources used for monitoring are called a performance monitoring overhead.

The monitoring system 102 controls the performance monitoring overhead used for monitoring the one or more client devices 112a-n by the monitoring system 102 so as not to exceed a threshold level of computing resources available to the monitoring system and the client devices. Generally, even during periods of high activity for the client devices 112a-n, the monitoring system 102 is configured to accurately summarize a performance of the client devices 112a-n and the applications 104a-n while controlling the bandwidth used for monitoring below a threshold level. For example, the monitoring system 102 can control the amount of computing bandwidth used for performance monitoring the execution of the applications 104a-n by the respective client devices 112a-n. The monitoring system 102 may limit the bandwidth to an absolute threshold, such as less than 5 MB (Megabytes) per minute. In some implementations, the monitoring system 102 may limit the bandwidth to a relative threshold, such as less than 1-5% of performance monitoring bandwidth or less than 1-5% of overall system bandwidth. Generally, the monitoring system 102 is configured to handle 100% of original data, but can reduce data footprint to 0.5% of original data size.

The client devices 112a-n are each configured to execute respective application instances 104a-n. The application instances 104a-n are software programs that are configured to perform any computing purpose monitoring system 102. For example, client devices 112a-n, by the application instances 104a-n, are configured to host websites, data farms, cloud computing functionality, or any such purpose. The application instances 104a-n can be identical or different from one another. The client devices 112a-n can operate independently from one another or can operate together and send data to and from one another over the network 106.

The one or more client systems 112a-n are generally distributed over a computing network 106, each executing one or more instances 104a-n of the application 104. The monitoring system 102 generally includes a data processing system configured to communicate with the client systems 112a-n on the network 106. The monitoring system 102 is configured to monitor how the application instances 104a-n are executing by tracking execution exceptions that are generated by the client devices 112a-n and reported to the monitoring system over the network 106.

The monitoring system 102 is configured to receive the event data 108a-n of the application instances 104a-n.

Generally, the event data 108a-n are generated by the one or more respective instances 104a-n of the application during execution and are reported in real time (e.g., when generated) to the monitoring system 102 as a data stream (e.g., a continuous or semi-continuous data stream). As previously described, the event data 108a-n illustrate how an application instance 104a-n is executing.

In response to receiving the event data 108a-n, the monitoring system 102 structures the event data for storing in the analytics database 116. The monitoring system 102 structures the event data 108 to optimize performance of monitoring services. The monitoring system 102 structures the event data 108 based on structure associated with each of the spans of the event traces.

The structure of the event data 108 stored in the analytics database 116 is configured to optimize insertion performance of data into the analytics database 116. Insertion performance includes how much overhead is required for insertion of new event data of the data streams into the analytics database 116. Generally, insertion performance is rated as an amount of event data 108 per unit of time.

The structure of the event data 108 stored in the analytics database 116 is configured to optimize query performance for retrieving data from the analytics database 116. Query performance refers to a latency or processing overhead associated with finding event data 108 responsive to a query. In some implementations, the structure of the event data 108 in the analytics database 116 enables relatively fast query performance such that a small amount of data are searched (relative to an amount of unstructured data that would be searched) to find the data responsive to the query in the analytics database.

The structure of the event data 108 stored in the analytics database 116 is configured to minimize storage size of the event data in the analytics database. The storage size refers to an amount of space that is used to store a given number of traces of the event data 108. The structure of the event data in the analytics database 116 allows redundant data to be discarded without losing any information (e.g., meaning or context) of the event data 108. This means that the original event data 108 are reconstructed in entirety from the remaining data in the analytics database 116. For example, the structure of the event data 108 allows for de-duplication that reduces the event data 108 by as much as 80% from the original size without losing any information.

The structure of the event data 108 stored in the analytics database 116 is configured to preserve maximum flexibility of operation of the monitoring system 102. Flexibility refers to an ability to insert event data 108 and query attributes that are not predefined, predetermined, or otherwise known in advance. Rather, event data 108 having any given structure, size, and content are processed by the monitoring system 102 to structure that event data as subsequently described to improve performance of the monitoring system.

The monitoring system 102 is configured to structure the event data 108 as the event data are received from the client devices 104a-n. The event data 108 are generally in the form of real time data streams from the client devices 104a-n. The monitoring system 102 ingests and processes the data streams in a continuous or semi-continuous manner, rather than as data batches. The monitoring system 102 is thus configured to ingest event data 108 from a given data stream as it arrives and add it to the analytics database 116 independent of ingesting other event data 108 arriving from other data streams.

The monitoring system 102 is configured to de-duplicate the event data 108 received from the data streams. The monitoring system 102 is configured to de-duplicate the event data 108 in two ways. First, the monitoring system 102 de-duplicates the structure of the event data. The structure of the event data 108 is de-duplicated because many traces and/or spans of the traces share a common structure. This structure is identified and stored as a de-duplicated data item in the analytics database 116. As subsequent event data 108 are received that include the same structure, the monitoring system 102 determines that the structure is known and associates the incoming event data with the known structure already stored in the analytics database 116. Second, the monitoring system 102 is configured to de-duplicate the values of the traces and spans in addition to the de-duplicated structures. In some implementations, many events of the events data 108 are machine generated. Some events are identical or nearly identical. The monitoring system 102 is configured to generate a de-duplication table that maps values of the events data 108, which can include strings of many characters, to index values. The data are stored as a string of index values, reducing the size of the data substantially. When combined with structure de-duplication, the information of events of the events data 108 is represented in the analytics database 116 in a relatively small data footprint.

The monitoring system 102 de-duplicates the event data 108 using a de-duplication module 110. The monitoring system 102 is configured to assign a unique index value to a respective unique value that is included in the ingested event data 108. For example, given the input {user: john, service: database, owner: john}, the de-duplication module 110 generates a de-duplication mapping table {user: 1, john: 2, service: 3, database: 4, owner: 5}. The de-duplicated data record thus includes {1:2, 3:4, 5:2}. The de-duplication process is based on the following process. For each value of the event data 108, determine whether the value is already included in the mapping table. If the value has already been mapped, use the index value for that value to represent the value in the de-duplicated data. Otherwise, generate a new index value and map the value to the new index value. The mapping is included in the mapping table.

The monitoring system 102 generally ingests many records of the event data 108 with similar structure. In this case, the size of the de-duplication table does not significantly increase, while the de-duplicated data record includes significantly fewer bytes of storage than the original event data 108.

The de-duplication module 110 is configured to manage a size of the de-duplication tables to prevent the mapping tables from growing indefinitely. Generally, the data streams of the events data 108 are time-series data. The events data 108 is ingested over time and is subsequently discarded after some time. This process is similar to a First-In-First-Out (FIFO) ordering, though events may arrive slightly out-of-order. Exact FIFO ordering is not available. Reference counting includes associating a counter to each entry in the mapping table and incrementing the count each time the value of that entry is found in the event data 108 and de-duplicated. The count is decremented each time the value expires or is otherwise no longer needed. When the count reaches zero, there are no more references to the value in the stored event data 108, and the entry is removed from the mapping table. This can incur some performance penalty.

Figure 2:
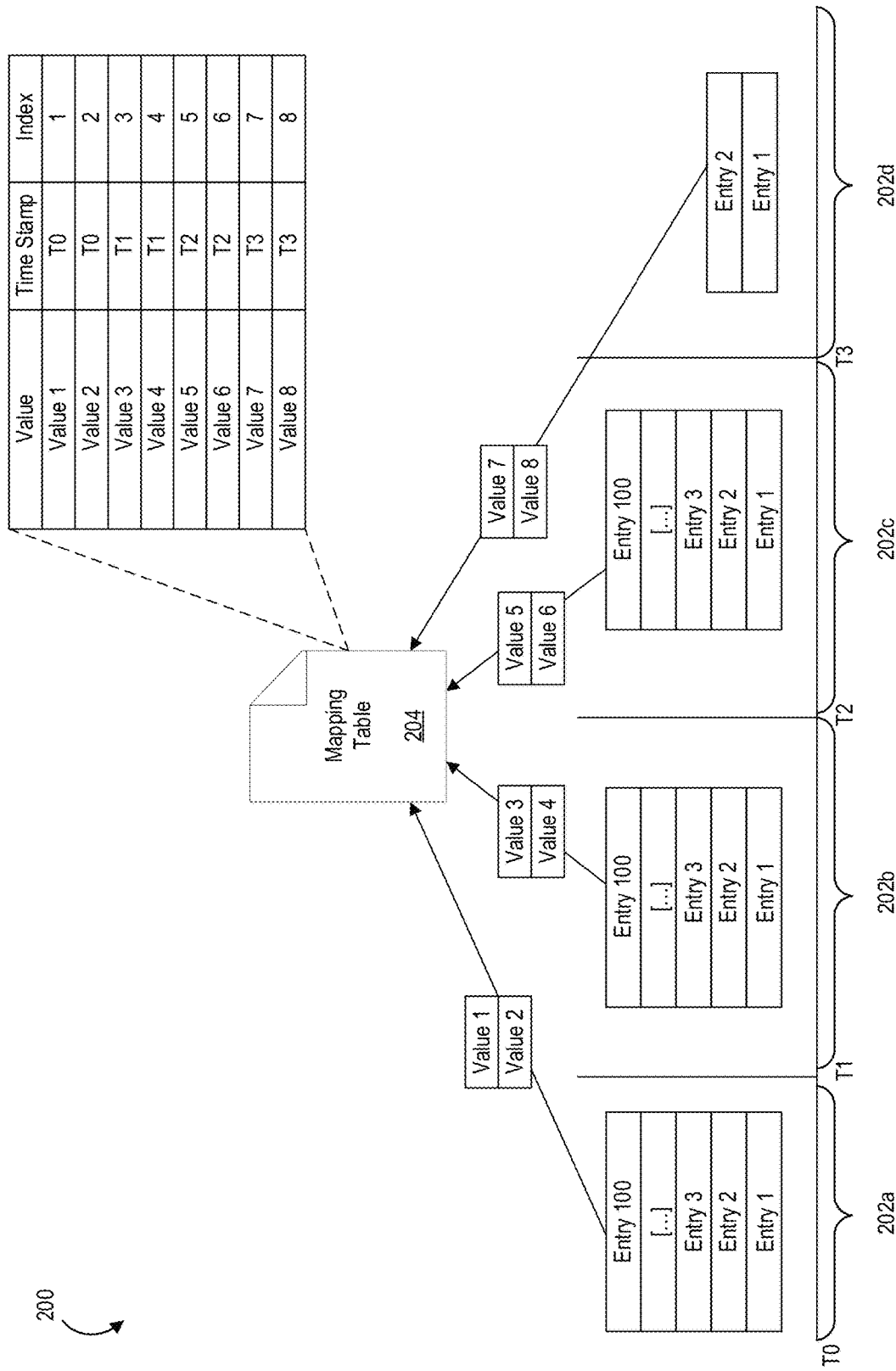
FIG. 2 illustrates an example of a first in, first out (FIFO) analytics database structure.

FIG. 2 shows an example of a FIFO structure 200 generated by the monitoring system 102. The FIFO structure 200 reduces or eliminates the performance penalty of reference counting while still maintaining the size of the mapping tables for the de-duplicated data. The FIFO structure 200 includes a plurality of portions 202 (also called arenas, buckets, etc.) that are ordered in time. Structure 200 includes four arenas 202a-d. Generally, the events of the events data 108 are each associated with a particular time (e.g., a time stamp). However, the events are generally received slightly out of order from the many application instances 104a-n. Though the events are slightly out of sequence, the events can still be associated with a broader time period to be ordered at a higher level. Because events of the events data 108 arrive over time as data streams, the events of the data stream are stored in a current available arena of the FIFO structure that includes data for the current time period. For example, arena 202a is associated with events having time stamps valued between T0 and T1. Arena 202b is associated with events having time stamps valued between T1 and T2. Arena 202c is associated with events having time stamps valued between T2 and T3. Arena 202d is associated with events having time stamps valued later than T3, or T3 to the present time.

The arenas of the FIFO structure are each of an approximately equal, fixed size representing a continuous block of memory or storage in the analytics database 116. In this example, the arenas can each store 100 events, though in practice each arena can store up to tens of thousands of events. The arenas are ordered in a sequence based on time of generation, though they need not represent equal time period lengths. Because the arenas are fixed in data footprint size, they can vary with respect to the time period lengths each represents as more or less events are received at given points in time, or as de-duplication results in a variable rate of adding data to the arenas. Therefore the difference between T0 and T1 does not need to be equal to the time difference between T1 and T2, and so forth.

Each arena is associated with a de-duplication mapping table 204. The mapping table stores index-timestamp pairs for values of the events data that are received for the arenas 202a-d. Once an arena 202a is filled, the next arena 202b is generated. The time T2 is based on when the arena T1 is filled. The arenas 202a-d are thus sequential in time. A creation time-stamp is associated with each arena 202a-d. When a value of the events data is de-duplicated for an arena (e.g., arena 202a), the creation time-stamp of the arena (e.g., T0) is associated with the entry in the de-duplication mapping table 204. Each time a new value is found in a given arena (e.g., arena 202b), the timestamp of that latest arena (e.g., T1) is associated with the value, and the old entry storing the value in the table 204 is discarded. In some implementations, the time stamp value is updated to the later time stamp value.

When memory is low, the first arena (e.g., arena 202a) in the FIFO of arenas is removed by the de-duplication module 110. All entries from the de-duplication table 204 that have a timestamp older than the oldest arena still in memory are removed from the de-duplication mapping table 204. This configuration enables the monitoring system 102 to have nearly zero performance overhead for maintaining the de-duplication table 204 when freeing memory in comparison to reference counting. For example, using reference counting, the de-duplication module 110 iterates over all the values in the arena 202a, and decrements the respective value in the de-duplication table. Values that are very common and have high counts are repeatedly checked, though their corresponding values are unlikely to be removed from the mapping table 204. In contrast, the de-duplication module 110 only checks values in the de-duplication table 204 that are no longer needed. The de-duplication module 110 checks each such value exactly once and does not need to check the entries stored in the arena 202a prior to removing them.

In addition to de-duplicating the values of the event data 108, the de-duplication module 110 is configured to de-duplicate the structure (e.g., order of fields) of the events received from the client devices 104a-n. The structures of the events are often repeated, as the events data are often machine generated (e.g., log messages). When event data 108 are received (e.g., a message), the order of fields of the event can be separated into a separate value for storing in the mapping table 204.

Figure 3:
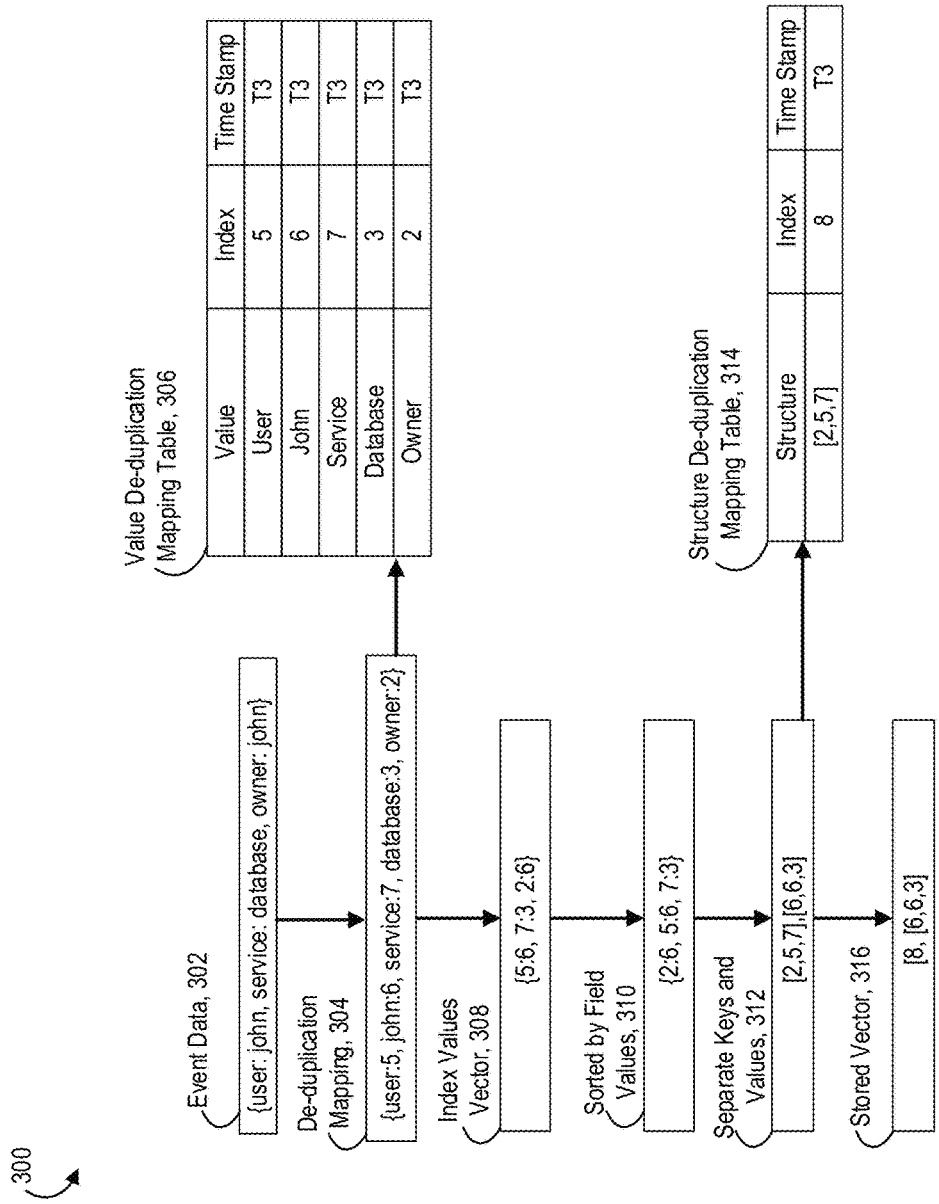
FIG. 3 illustrates example data for performing structure de-duplication for event data.

FIG. 3 shows an example of a process 300 for de-duplication of structure data by the de-duplication module 110 of the monitoring system 102. The de-duplication module 110 receives event data 302 including the following span: {user: john, service: database, owner: john}. The de-duplication module 110 performs de-duplication of the values of the event data 302 as previously described. As shown, a mapping 304 is generated that associates indices with values of the event data. An example mapping 304 includes {user: 5, john: 6, service: 7, database: 3, owner: 2}. The mappings are stored in a de-duplication mapping table 306, as previously described. The generated vector 308 in this example includes {5:6, 7:3, 2:6}, where each value is represented as its index.

To extract the structure of the event data 302, the de-duplication module 110 sorts the values of the entry by its key values associated with the fields of the event data 302. In this example, the digits representing the values "user," "service," and "owner," represent the fields of the event data 302. Sorting by the field values, the sorted entry 310 is represented as {2:6, 5:6, 7:3}. The de-duplication module 110 then separates the field indices from the indices representing the values of those fields in the event data 302. The separated data 312 is formatted as [field indices], [field value indices]. The separated data 312 in this example includes [2, 5, 7], [6, 6, 3], where [2,5,7] represent fields of the event data 302, and [6,6,3] represents the respective values of those fields. The order of fields is the structure of the event data.

The de-duplication module 110 generates a second de-duplication mapping table called the structure mapping table 314 or the structure de-duplication mapping table. The structure mapping table 314 assigns index values to structure strings of the spans of the event data 302, rather than directly to values or field names of the spans. Because many spans share the same structure, the field order is a canonical structure description, the de-duplication module 110 can de-duplicate structures using the same mechanism as for de-duplicating values, previously described. As shown in table 314, the structure de-duplication table includes an entry {8: [2, 5, 7]}, where "8" represents the index value, and [2,5,7] is the structure associated with the index value of "8." The stored data in the analytics database 116 is reduced to the following vector 316: [8, [6, 6, 3], where "8" is the structure of the span of the event data 302, and where [6,6,3] are the values of the fields of the span for that structure. Because many spans and traces have similarity in structures, there is a significant savings in memory in the analytics database 116. Vector 316 is stored in an arena of the analytics database 116.

Figure 4:
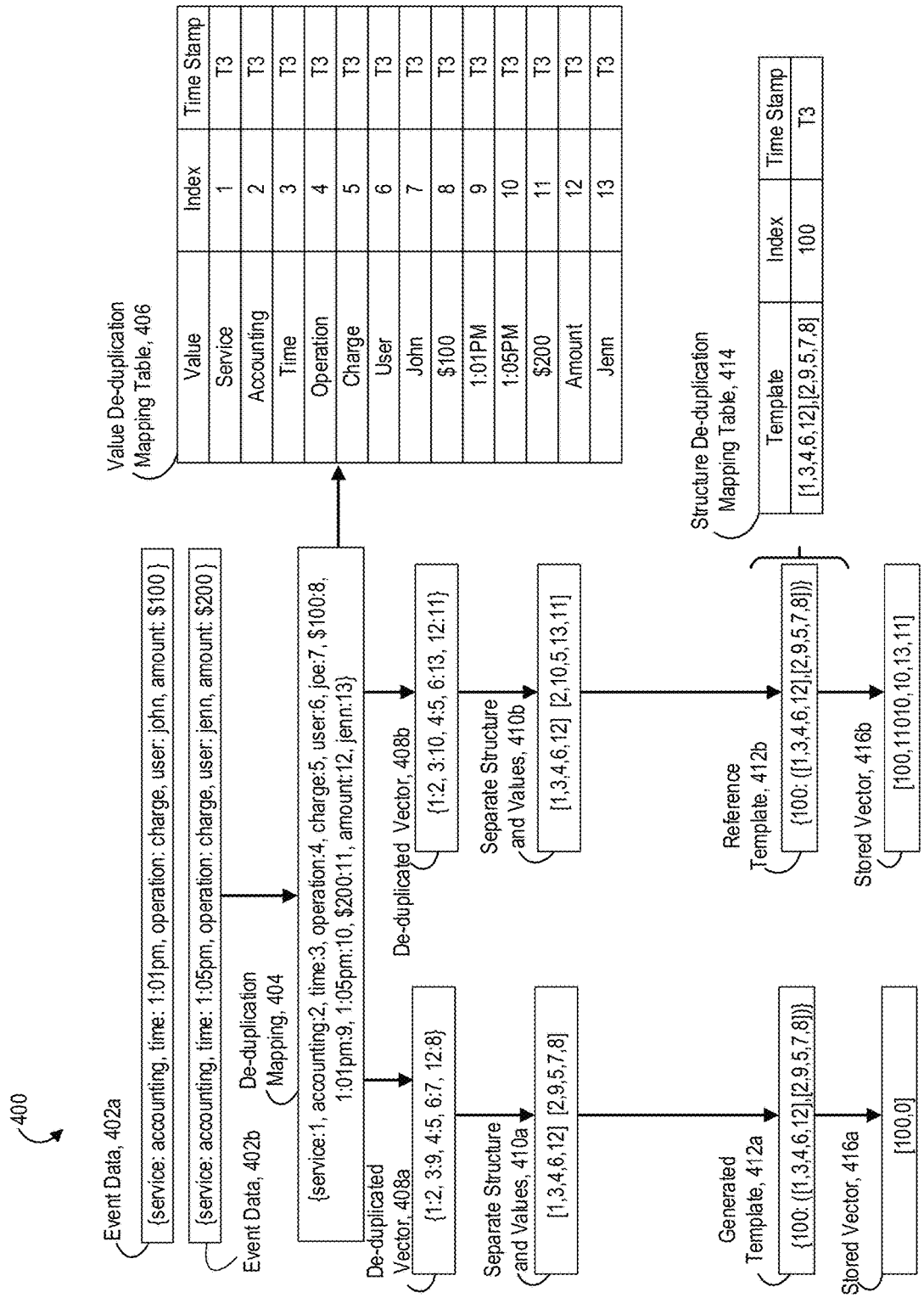
FIG. 4 illustrates example data for performing structure de-duplication for event data by generating a template.

FIG. 4 shows a process 400 for template-based de-duplication of data in the analytics database 116 by the template generation module 112 of the monitoring system 102 of FIG. 1. Generally, when the monitoring system 102 generates a new structure in a first event, data from that first event of the new structure is used as a template, stored with the structure. Any later instance of an event that has the same structure is only stored as a difference-set compared to the template.

The template generation module 112 is configured to generate templates that are stored in mapping tables in the analytics database 116. The de-duplication module 110 can compare ingested event data 108 to the templates stored in the analytics database 116. The templates of the analytics database 116 represent common patterns of fields for spans of traces of the events data 108 and common values for those fields. The de-duplication module 110 is configured to compare the ingested event data 108 to the template and store only the differences between the ingested data and the stored template. The reduction in data that is stored as a result (even in comparison to the de-duplication techniques previously described) is called template reduction.

The template generation module 112 generates templates in a template mapping table 402. It can be difficult to determine in advance what values are common values for a given set of client devices 104a-n. While it is possible to make some assumptions based on heuristics of gathered event data 108, the template generation module 112 does not make such assumptions. Rather, the template generation module 112 is configured to generate templates in a flexible manner that can accommodate unknown or unexpected data in the event data 108. For example, given the example traces previously described for purchasing an item:

---

Trace: {id: 1,
    span: {id: 1, user: john, service: cart, time: 1 pm, operation: additem, item: coffee_table},
    span: {id: 2, service: warehouse, time: 1 pm, operation: check stock, item: coffee_table}
    span: {id: 3, service: accounting, time: 1:01 pm, operation: charge, user: john, amount: $100}
}

---

While it is reasonable to assume that all spans that an 'amount' and 'user' attributes would also have 'service: accounting' and 'operation: charge,' this is not necessarily the case. Heuristic analysis of received event data 108 to determine which structures are common or to determine rules to apply to incoming data can result in additional monitoring overhead. The template generation module 112 is configured to generate templates for template reduction in a flexible manner that does not require performing such an analysis, making assumptions about the data, or requiring predefined associations between values or fields.

The template generation module 112 is configured to generate templates as follows. When the monitoring system 102 ingests event data 108 including a new structure that has not already been ingested, the template generation module 112 adds the structure as an entry in the structure de-duplication table (as previously described in relation to FIG. 3). The template generation module 112 also appends that event's values to that entry of the structure de-duplication table.

When subsequent event data 108 are received, the de-duplication module 110 stores only the list of values where the event data 108 (e.g., a trace) is not the same as the template, rather than storing the values of the event data. This is similar to how event data are stored in the arenas, as previously described. The de-duplication module 110 encodes the differences using a bitset (e.g. sequence of binary values), thus incurring only 1 bit of overhead per value of the event data which is not the same as the stored template.

An example process 400 of template generation is shown in FIG. 4. The template generation module 112 receives event data 402a-b. Event data 402a includes a message {service: accounting, time: 1:01 pm, operation: charge, user: john, amount: $100}. Event data 402b includes a message {service: accounting, time: 1:05 pm, operation: charge, user: jenn, amount: $200}. A value de-duplication mapping table 406 is generated based on the following indices: {service: 1, accounting: 2, time: 3, operation: 4, charge: 5, user: 6, john: 7, $100: 8, 1:01 pm: 9, 1:05 pm: 10, $200: 11, amount: 12, jenn: 13}. The first message 402a is de-duplicated to a de-duplicated vector 408a {1:2, 3:9, 4:5, 6:7, 12:8}. The second message is de-duplicated to de-duplicated vector 408b {1:2, 3:10, 4:5, 6:13, 12:11}. Vectors 408a and 408b can be stored or for further processing.

The template generation module 112 then determines the structures of the vectors 408a-b, maps them, and de-duplicates them, as previously described. For de-duplicated vector 408a, the structure is [1, 3, 4, 6, 12] and the values [2, 9, 5, 7, 8], and these are stored as separated structure and values 410a. For de-duplicated vector 408b, the structure is [1, 3, 4, 6, 12] and the values [2, 10, 5, 13, 11], and these are stored as separated structure and values 410b.

For the first message, this is the first document stored in the structure de-duplication table 414. The entry 412a is stored in the structure de-duplication table 414 as {100: ([1, 3, 4, 6, 12], [2, 9, 5, 7, 8])}. The vector 416a stored in an arena of the analytics database 116 is [100,0], which refers to the structure being template entry 100 of table 414, and no difference from the template.

The second message 402b references an existing structure in its separated structure and values 410b. The structure is [1, 3, 4, 6, 12] and is already in a template 412a. Rather than generating a new template, the de-duplication module 110 refers to the existing template in the template mapping table 414 indexed to value 100. The entry 412b that is stored in the arena is [100, 11010, 10, 13, 11]. In this vector 416b, 100 is the referenced template in table 414. The next value, 11010, is a binary value indicating that second, fourth and fifth values are different from the template. The final values, 10, 13, and 11, represent the values of the fields that are different from the template.

The monitoring system 102 is configured to ingest any kind of event data and store it in entirety, though de-duplication tables significantly reduce the number of bytes required to record it. The dynamic structures allow for data of any schema, even such that is not known beforehand, to be stored efficiently. For example, structure de-duplication and template forming as previously described and reduce data by orders of magnitude (e.g., 500:1 in a general example, though exact data reduction can vary). No counters are needed for this configuration of de-duplicated values, reducing monitoring overhead in comparison with reference counting techniques. The monitoring system can be distributed, such that mapping tables previously described are local to a particular client device 112a-n. There is no coordination required among different client devices 112a-n for the de-duplication and template reduction previously described or among different instances of monitoring system 102. Queries can be sent to each system (e.g., each monitoring system 102), which can map the query to its local table values.

The monitoring system 102 is configured to optimize query response performance using the query response module 114 of FIG. 1. For example, if searching for a particular value (e.g., a particular user: John), the mapping tables can be searched relatively quickly. If either the index (e.g., key) 'user' or the value 'John' cannot be found in the de-duplication tables, no event data 108 include the user 'John.' In some implementations, the de-duplication mapping tables are hash-tables, or a similar configuration. The cost of searching these tables for a value is linear (e.g., O(1)). If the key and value are found in the de-duplication mapping tables, the query response module 114 translates the query to numbers, such that looking for {user: John} might be translated to the query {does key 1 have value 2}, using the example event data previously described.

The query response module 114 can review the structure de-duplication tables (e.g., tables 314, 414 of FIGS. 3-4). The key 1, referring to 'user,' might not exist in many structures. The structure de-duplication tables are based on sorted key numbers, as each structure is defined as the sorted list of keys within that structure. The number of unique structures is significantly less than the number of unique entries in the arenas. The query response module 114 analyzes the list of structures relatively quickly in comparison to checking each of the entries in the arenas. For example, the query response module 114 performs a binary search on each structure to see if the key is even defined within that structure. The query response module 114 can then review only entries in the arenas that have structures that are known to include the key requested in the query.

The structures also include the templates of the documents (e.g. the values of the first document having that structure), as previously described in relation to FIG. 4. The query response module 114 compares the value being searched (John') against the templates in the mapping table 414. If the query response module 114 finds a matching template, the query response module 114 ignores any document having difference bits that indicate that the entry includes a different value than 'John'. If the query response module 114 does not find a matching template, the query response module 114 checks only entries having a difference bit indicative of a different value to the template for the key "user."

In an aspect, the monitoring system 102 is configured to generate reports that are responsive to the queries received. The type of report generated is specified by a user or another computing system depending on how the profile data are being used. For example, output data generated by the reporting module can include portions of the event data that is generated from the de-duplicated data stored in the analytics database 116. In other examples, visualizations such as line graphs, tables, or other outputs are generated. These are continuously or intermittently updated as sampling continuous on an ongoing basis along with reporting.

In an aspect, results are sent to a monitoring dashboard in real time or near real time. Here, real time includes a processing of data as its received and immediate output of that data without delaying, in which any latency is generally caused by the processing of the data (rather than internally storing any data for batch processing). Real time or near real time indicators can show how many exceptions are being generated per second and their types.

Returning to FIG. 1, the monitoring system 102 is communicatively connected to the client devices 112a-n and the computing system 102 through a network 106. The monitoring system 102 can include, but are not limited to, e.g., one or more server computers. The monitoring system 102 can be configured to transmit, receive, and/or process data. For instance, in some cases, the monitoring system 102 can be a web server configured to receive and store content (e.g., web content, such as a web page), and make the content available to one or more other computer systems (e.g., client devices 112a-n). Upon receiving a request (e.g., from the client devices 112a-n), the monitoring system 102 can retrieve the requested content (e.g., resource 120 and its structure data 118), and transmit the content to the requesting computer system to fulfill the request. In some cases, the monitoring system 102 can be owned, operated, and/or maintained by parties different from those that own, operate, and/or maintain the computing system 102.

The computing system 102 is also communicatively connected to one or more client devices 112a-n through the network 106. Each client devices 112a-n can include a respective user interface. Users can interact with the user interface to view content of the application instances 104a-n. Users can also interact with the user interface to transmit data to other devices (e.g., to the monitoring system 102). Users can interact with the user interface to issue commands (e.g., to the monitoring system 102). In some implementations, a user can install a software application onto a client devices 112a-n in order to facilitate performance of these tasks.

The client devices 112a-n can include any electronic device that is used by a user to view, process, transmit and receive data. Examples of the client devices 112a-n include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client devices 112a-n can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, the client devices 112a-n need not be located locally with respect to the rest of the environment 100, and can be located in one or more remote physical locations.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The monitoring system 102 is illustrated as a respective single component. However, in practice, each can be implemented on one or more computing devices. In some implementations, the monitoring system 102 can include multiple computing devices that are connected to the network 106. The monitoring system 102 can alternatively be a single computing device that is connected to the network 106. In some implementations, the monitoring system 102 need not be located locally to the rest of the environment 100, and portions of the monitoring system 102 can be can be located in one or more remote physical locations from the client devices 112a-n.

Figure 5:
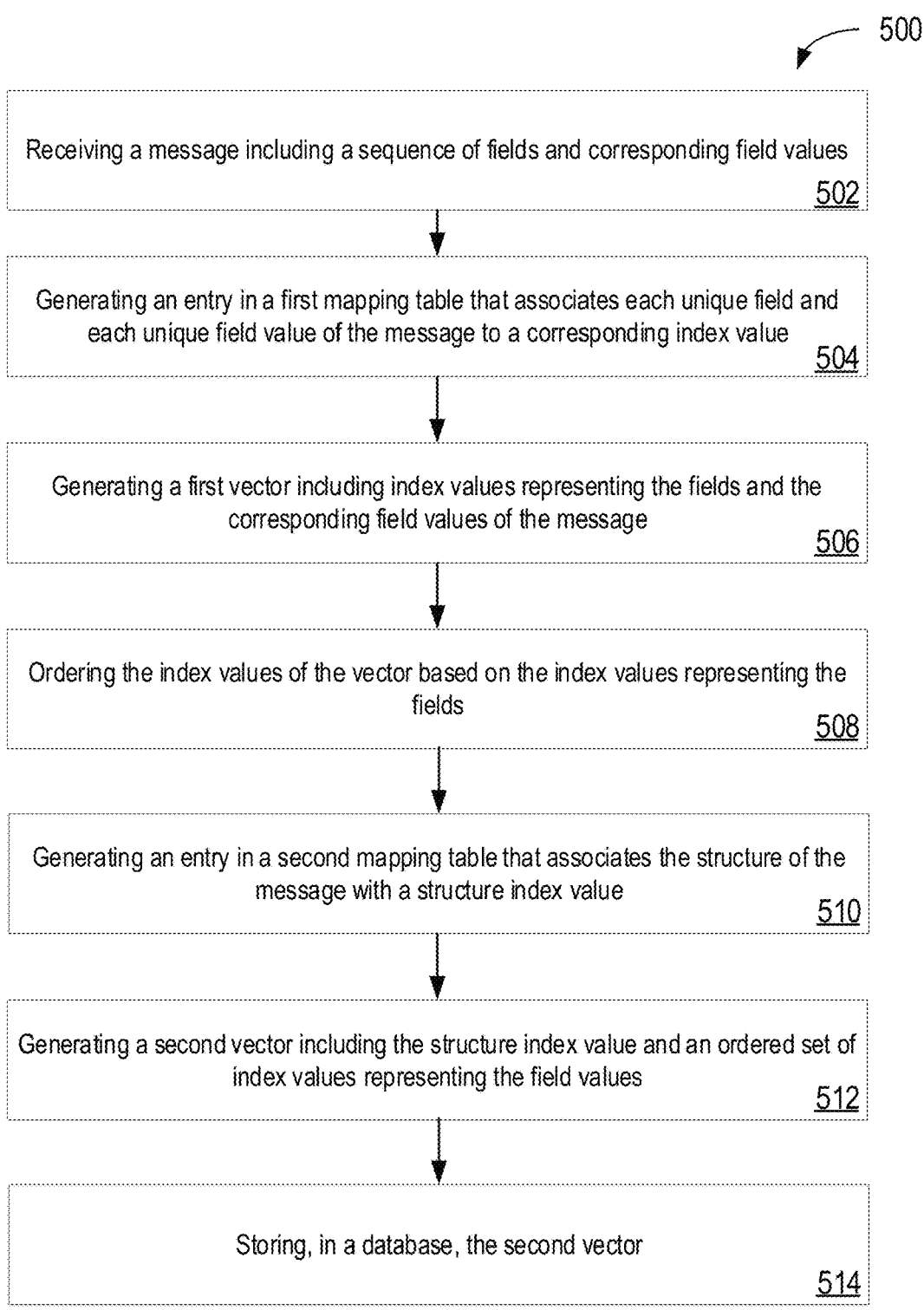
FIG. 5 shows an example process for performing data de-duplication.
Figure 6:
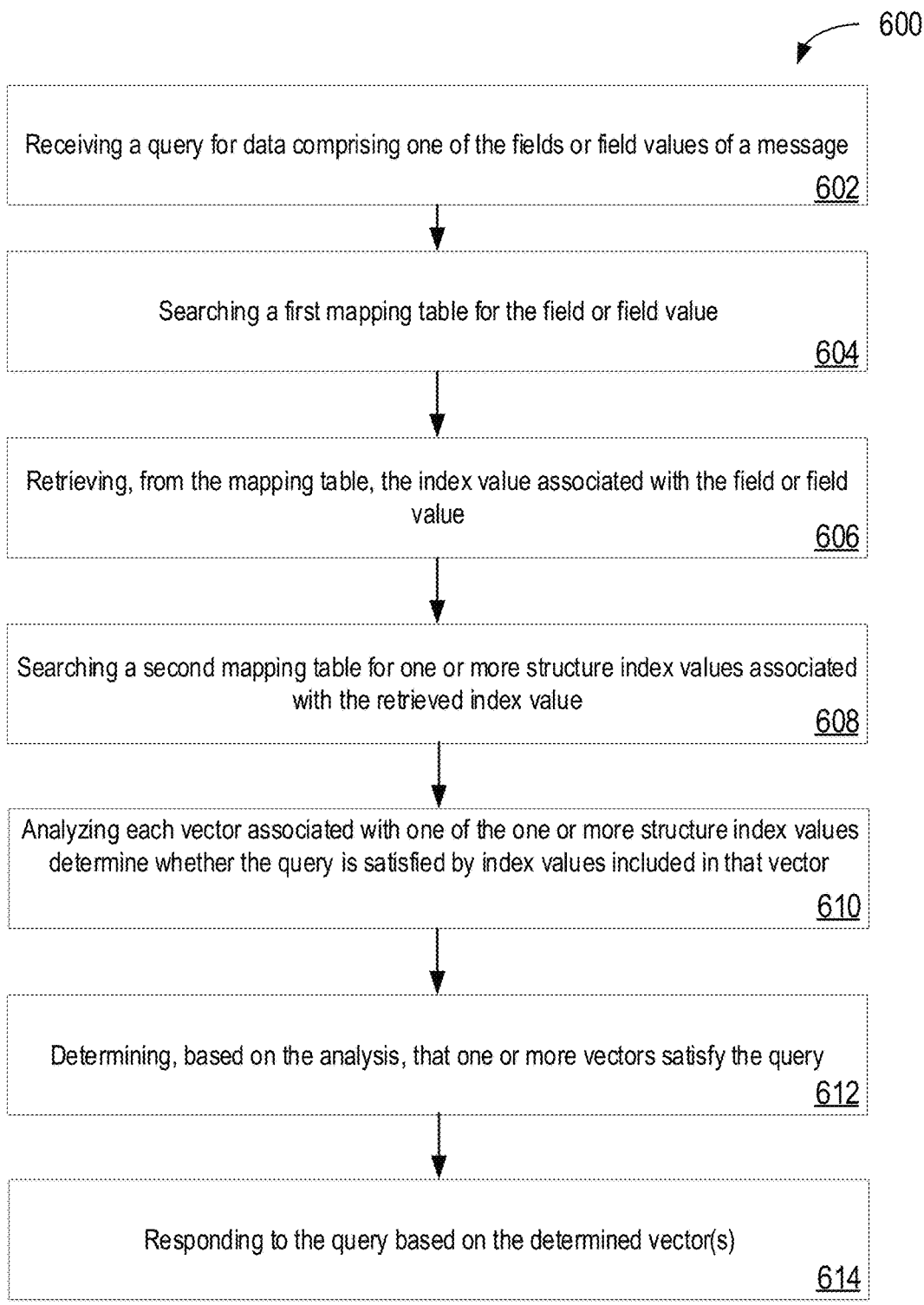
FIG. 6 show an example process for responding to a query.

FIGS. 5-6 shows example processes for data de-duplication and storage in an analytics database 116 by a monitoring system (e.g., the monitoring system 102 described in relation to FIG. 1). The process 500 of FIG. 5 includes a procedure for adding new entries to de-duplication mapping tables to de-duplicated each of the values of messages received in the event data by the monitoring system and also to de-duplicate the structure of those messages.

The process 500 includes receiving (502), from one or more computing systems (e.g., client devices 112*a-n*), a message (e.g., event data 108) including a sequence of fields and corresponding field values. The fields correspond to field names and the field values are the values paired with the field names. For example, for "user: John," "user" is a field, and "John" is the field value. The process 500 includes generating (504) an entry in a first mapping table that associates each unique field and each unique field value of the message to a corresponding index value that is unique to that unique field or that unique field value. The first mapping table is a de-duplication mapping table that associates an index value with each new field name or field value. As previously described, a time stamp is associated with the entry, and the time stamp in the entry is updated to correspond to the current arena available to store the de-duplicated message. Here, a unique field or unique field value is a field or field value that does not have an entry in the mapping table and thus is not already associated with an index value.

The process 500 includes generating (506), based on the mapping table, a first vector including index values representing the fields and the corresponding field values of the message. The first vector represents the message according to the index values representing each field and field value of the message in the order that these values are included in the actual message. The process 500 includes ordering (508) the index values of the vector based on the index values representing the fields. The ordered index values representing the fields indicate a structure of the message. In other words, the field and field value pairs are ordered based on the index values of the fields. The field index values are split into a first element, and the field value index values are split into a second element. The ordered index values representing the fields is the structure of the message.

The process 500 includes generating (510) an entry in a second mapping table that associates the structure of the message with a structure index value. The first element of the ordered field index values is itself associated with another index value in a structure mapping table. The structure index value now represents a structure of the message.

The process 500 includes generating (512) a second vector including the structure index value and an ordered set of index values representing the field values. The second vector thus includes the structure index value representing the structure of the message in a first element, and the index values representing the values of the fields are included in a second element. The second vector represents the message in a de-duplicated form. The process 500 includes storing the second vector in the database (e.g., the analytics database 116 of FIG. 1). As previously described, this can include storing the second vector in an arena (e.g., a block of memory) associated with a particular time stamp value.

FIG. 6 shows an example process 600 for responding to a query by a monitoring system (e.g., the monitoring system 102 of FIG. 1). The monitoring system 102 has already configured the value de-duplication mapping table and the structure de-duplication mapping table as previously described. In some implementations, the monitoring system 102 as generated a template including a reference to a particular structure and particular values of that structure. If a template is available, the templates can be searched to improve query response time (e.g., reduce latency of responding to queries) and also reduce a processing bandwidth for responding to the query.

The process 600 includes receiving (602) a query for data comprising one of the fields or field values of the message. The query can refer to a particular field name (e.g., "user"), a field value (e.g., "John"), or a combination of one or more field names and field values. The process 600 includes searching (604) a first mapping table for the field or field value. The first mapping table includes a value de-duplication mapping table associating an index value to each unique field name or field value. The process 600 includes retrieving (606) the index value associated with the field or field value of the query.

Once the index value(s) of interest are determined from the value de-duplication mapping table, the structure de-duplication mapping table can be searched. The process 600 includes searching (608) the second mapping table for one or more structure index values associated with the retrieved index value. This is a fast (e.g., linear) search. Only structures that include the index value of interest are further analyzed. The process 600 includes analyzing (610) each vector associated with one of the one or more structure index values determine whether the query is satisfied by index values included in that vector.

For each structure including a value indicated in the query, the index values representing the field values are checked. If a template match is found, the binary values are checked to determine if the value is present or absent from the message. Binary values indicating that different values are included can be ignored. If no template match is found, only vectors having binary values indicating a difference from the template are analyzed.

The process 600 includes determining (612), based on the analysis, that one or more vector(s) satisfy the query. The process 600 includes responding (614) to the query based on determining that the vector(s) satisfy the query. In some implementations, the vectors that are responsive to the query can used to generate the entire message. The value de-duplication mapping table is referenced to obtain each actual field value or field name for the message, and they are ordered based on the indicated structure.

[Inventors: the following material describes computing devices, and can be skipped during your review. You can proceed directly to the claims, below.]

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, monitoring system 102 and the client devices 112*a-n* can be implemented using digital electronic circuitry, or in computer software, firmware, or hardware, or in combinations of one or more of them. In another example, the process 800 can be implemented using digital electronic circuitry, or in computer software, firmware, or hardware, or in combinations of one or more of them.

Some implementations described in this specification (e.g., de-duplication module 110, the template generation module 112, and/or the query response module 114, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the de-duplication module 110, the template generation module 112, and/or the query response module 114 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 7:
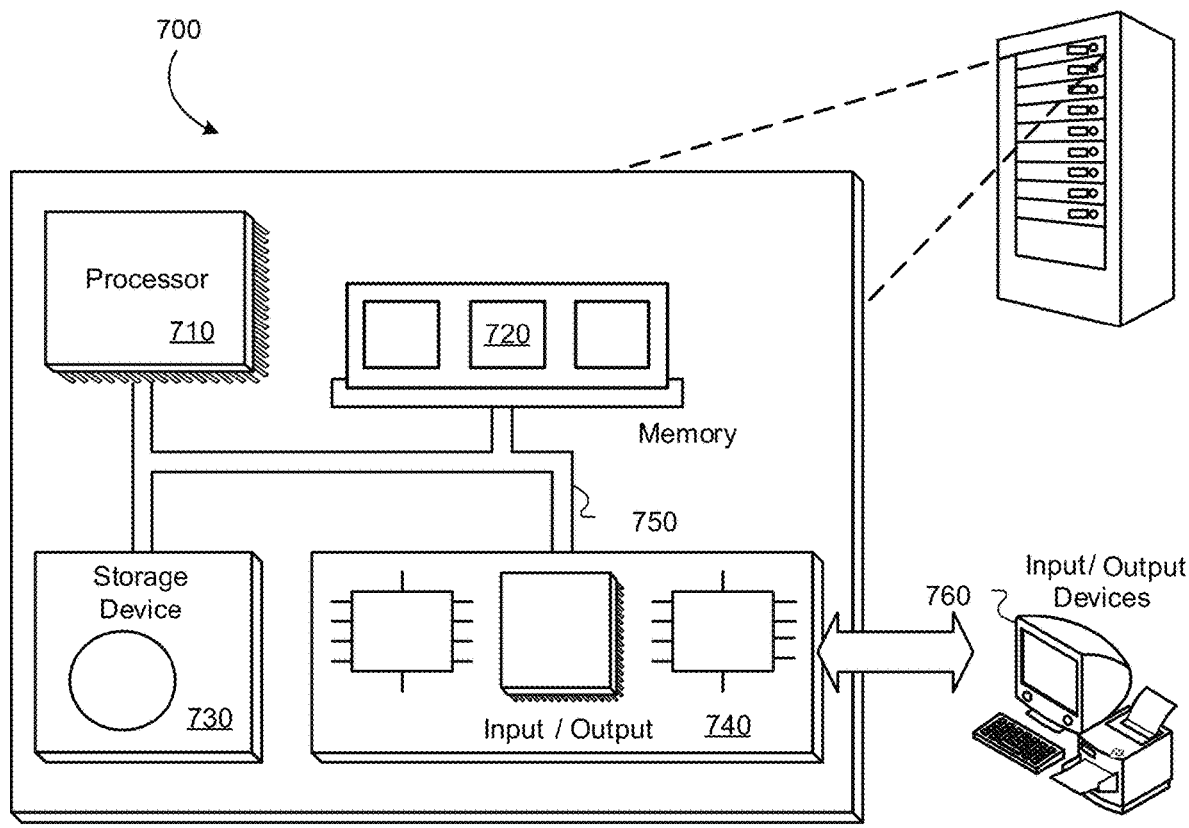
FIG. 7 is a diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. The processor 710 is capable of processing instructions for execution within the system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for de-duplicating data for storing in a database, the method comprising:
    associating a block of memory of the database with a time period;
    receiving, at a computing memory, from one or more computing systems during the time period, a message including fields and field values;
    determining that a field or field value of the message is excluded from entries of a first mapping table associated with the time period;
    when the field or the field value is excluded from the entries of the first mapping table associated with the time period, generating, in a computing memory, an entry in the first mapping table for associating the field of the message or the field value of the message to a corresponding index value that is unique to that field or to that field value;
    generating, in the computing memory, based on the first mapping table, a first vector including index values representing the fields and the field values of the message;
    ordering, in the computing memory, the index values of the first vector based on the index values representing the fields, wherein the ordered index values, representing the fields, indicate a structure of the message;
    generating, in the computing memory, an entry in a second mapping table that associates the ordered index values representing the structure of the message with a structure index value;
    generating, in the computing memory, a second vector including the structure index value and an ordered set of index values representing the field values; and
    storing, in the block of the memory of the database, the second vector, wherein the second vector deduplicates data of one or more subsequent messages in the memory by representing the one or more subsequent messages in the memory.

2. The method of claim 1, further comprising:
    associating, in the second mapping table with the second vector, a template index value;
    generating a third vector including the template index value and a binary value, each bit of the binary value representing a presence or absence of a field value that differs from the field values represented in the second vector; and
    storing, in the database, the third vector.

3. The method of claim 2, further comprising:
    receiving a query for data comprising one of the fields or field values of the message;
    searching the first mapping table for the one of the fields or field values;
    retrieving an index value associated with the one of the fields or field values;
    searching the second mapping table for one or more template index values associated with the retrieved index value;
    analyzing each vector associated with one of the one or more template index values determine whether the query is satisfied by a particular message represented by the vector, the analyzing comprising determining that binary value indicates the presence, in the particular message, of one or more values or field values indicated by the query;
    determining, based on analyzing, that the third vector represents the message that satisfies the query; and
    responding to the query based on determining that the third vector represents the message that satisfies the query.

4. The method of claim 2, wherein the message is a first message, the method further comprising:
    receiving, from the one or more computing systems, a second message including a second fields and second field values;
    determining, based on the first mapping table and the second mapping table, that a structure of the second message matches the structure of the first message;
    determining that the second field values of the second message differ from the field values of the first message; and
    generating a fourth vector representing the second message, the fourth vector comprising:
    the structure index value;
    a particular binary value indicating each field value of the second message that is different than a corresponding field value of the first message; and
    one or more additional index values representing the second field values of the second message that are different from the field values of the first message.

5. The method of claim 1, further comprising:
    associating the block of memory of the database with a time stamp value representing the time period, the block of memory including the second vector; and
    for each entry in the first mapping table and each entry in the second mapping table associated with the first vector, including the time stamp value corresponding to the block of memory in the database that stores the second vector.

6. The method of claim 5, further comprising:
    determining that a memory threshold for the database is exceeded by storing the second vector;
    deleting, from the database, each vector stored in a second block of memory associated with a second time stamp value that represents an earlier point in time than the time stamp value; and
    deleting, from the first mapping table and the second mapping table, each entry that includes the second time stamp.

7. The method of claim 5, further comprising:
    when the field or the field value is mapped to a particular entry in the first mapping table, the particular entry including a different time stamp value that represents an earlier point in time than the time stamp value, deleting the particular entry from the first mapping table.

8. The method of claim 1, further comprising:
    receiving a query for data comprising one of the fields or field values of the message;

searching the first mapping table for the one of the fields or field values;

retrieving an index value associated with the one of the fields or field values;

searching the second mapping table for one or more structure index values associated with the retrieved index value;

analyzing each vector associated with one of the one or more structure index values determine whether the query is satisfied by index values included in that vector;

determining, based on the analyzing, that the second vector satisfies the query; and responding to the query based on determining that the second vector satisfies the query.

9. A system for de-duplicating data for storing in a database, the system comprising:

at least one processor; and at least one memory storing instructions that, when executed by the at least one processor, cause the at least one processor to perform operations comprising:

associating a block of memory of the database with a time period;

receiving, at a computing memory, from one or more computing systems during the time period, a message including fields and field values;

determining that a field or field value of the message is excluded from entries of a first mapping table associated with the time period;

when the field or the field value is excluded from the entries of the first mapping table associated with the time period, generating, in a computing memory, an entry in the first mapping table for associating the field of the message or the field value of the message to a corresponding index value that is unique to that field or to that field value;

generating, in the computing memory, based on the first mapping table, a first vector including index values representing the fields and the field values of the message;

ordering, in the computing memory, the index values of the first vector based on the index values representing the fields, wherein the ordered index values, representing the fields, indicate a structure of the message;

generating, in the computing memory, an entry in a second mapping table that associates the structure of the message with a structure index value;

generating, in the computing memory, a second vector including the structure index value and an ordered set of index values representing the field values; and storing, in the block of the memory of the database, the second vector, wherein the second vector deduplicates data of one or more subsequent messages in the memory by representing the one or more subsequent messages in the memory.

10. The system of claim 9, the operations further comprising:

associating, in the second mapping table with the second vector, a template index value;

generating a third vector including the template index value and a binary value, each bit of the binary value representing a presence or absence of a field value that differs from the field values represented in the second vector; and storing, in the database, the third vector.

11. The system of claim 10, the operations further comprising:

receiving a query for data comprising one of the fields or field values of the message;

searching the first mapping table for the one of the fields or field values;

retrieving an index value associated with the one of the fields or field values;

searching the second mapping table for one or more template index values associated with the retrieved index value;

analyzing each vector associated with one of the one or more template index values determine whether the query is satisfied by a particular message represented by the vector, the analyzing comprising determining that binary value indicates the presence, in the particular message, of one or more values or field values indicated by the query;

determining, based on the analyzing, that the third vector represents the message that satisfies the query; and responding to the query based on determining that the third vector represents the message that satisfies the query.

12. The system of claim 10, wherein the message is a first message, the operations further comprising:

receiving, from the one or more computing systems, a second message including a second fields and second field values;

determining, based on the first mapping table and the second mapping table, that a structure of the second message matches the structure of the first message;

determining that the second field values of the second message differ from the field values of the first message; and generating a fourth vector representing the second message, the fourth vector comprising:

the structure index value;

a particular binary value indicating each field value of the second message that is different than a corresponding field value of the first message; and one or more additional index values representing the second field values of the second message that are different from the field values of the first message.

13. The system of claim 9, the operations further comprising:

associating a block of memory of the database with a time stamp value, the block of memory including the second vector; and for each entry in the first mapping table and each entry in the second mapping table associated with the first vector, including the time stamp value corresponding to the block of memory in the database that stores the second vector.

14. The system of claim 13, the operations further comprising:

determining that a memory threshold for the database is exceeded by storing the second vector;

deleting, from the database, each vector stored in a second block of memory associated with a second time stamp value that represents an earlier point in time than the time stamp value; and deleting, from the first mapping table and the second mapping table, each entry that includes the second time stamp.

15. The system of claim 13, the operations further comprising:

when the field or the field value is mapped to a particular entry in the first mapping table, the particular entry including a different time stamp value that represents an earlier point in time than the time stamp value, deleting the particular entry from the first mapping table.

16. The system of claim 9, the operations further comprising:
receiving a query for data comprising one of the fields or field values of the message;
searching the first mapping table for the one of the fields or field values;
retrieving an index value associated with the one of the fields or field values;
searching the second mapping table for one or more structure index values associated with the retrieved index value;
analyzing each vector associated with one of the one or more structure index values determine whether the query is satisfied by index values included in that vector;
determining, based on the analyzing, that the second vector satisfies the query; and
responding to the query based on determining that the second vector satisfies the query.

17. One or more non-transitory computer readable media storing instructions for de-duplicating data for storing in a database, the instructions, when executed by at least one processor, being configured to cause the at least one processor to perform operations comprising:
associating a block of memory of the database with a time period;
receiving, at a computing memory, from one or more computing systems during the time period, a message including fields and field values;
determining that a field or field value of the message is excluded from entries of a first mapping table associated with the time period;
when the field or the field value is excluded from the entries of the first mapping table associated with the time period, generating, in a computing memory, an entry in the first mapping table for associating the field of the message or the field value of the message to a corresponding index value that is unique to that field or to that field value;
generating, in the computing memory, based on the first mapping table, a first vector including index values representing the fields and the field values of the message;
ordering, in the computing memory, the index values of the first vector based on the index values representing the fields, wherein the ordered index values, representing the fields, indicate a structure of the message;
generating, in the computing memory, an entry in a second mapping table that associates the structure of the message with a structure index value;
generating, in the computing memory, a second vector including the structure index value and an ordered set of index values representing the field values; and
storing, in the block of the memory of the database, the second vector, wherein the second vector deduplicates data of one or more subsequent messages in the memory by representing the one or more subsequent messages in the memory.

18. The one or more non-transitory computer readable media of claim 17, the operations further comprising:
associating, in the second mapping table with the second vector, a template index value;
generating a third vector including the template index value and a binary value, each bit of the binary value representing a presence or absence of a field value that differs from the field values represented in the second vector; and
storing, in the database, the third vector.

19. The one or more non-transitory computer readable media of claim 18, the operations further comprising:
receiving a query for data comprising one of the fields or field values of the message;
searching the first mapping table for the field or field value;
retrieving an index value associated with the field or field value;
searching the second mapping table for one or more template index values associated with the retrieved index value;
analyzing each vector associated with one of the one or more template index values determine whether the query is satisfied by a particular message represented by the vector, the analyzing comprising determining that binary value indicates the presence, in the particular message, of one or more values or field values indicated by the query;
determining, based on the analyzing, that the third vector represents the message that satisfies the query; and
responding to the query based on determining that the third vector represents the message that satisfies the query.

20. The one or more non-transitory computer readable media of claim 18, wherein the message is a first message, the operations further comprising:
receiving, from the one or more computing systems, a second message including a second fields and second field values;
determining, based on the first mapping table and the second mapping table, that a structure of the second message matches the structure of the first message;
determining that the second field values of the second message differ from the field values of the first message; and
generating a fourth vector representing the second message, the fourth vector comprising:
the structure index value;
a particular binary value indicating each field value of the second message that is different than a corresponding field value of the first message; and
one or more additional index values representing the second field values of the second message that are different from the field values of the first message.

* * * * *